US006367269B1

(12) United States Patent
Hanson et al.

(10) Patent No.: US 6,367,269 B1
(45) Date of Patent: Apr. 9, 2002

(54) ELECTRONIC THROTTLING VALVE DIAGNOSIS AND PREVENTATIVE SHUTDOWN CONTROL

(75) Inventors: Jay Lowell Hanson, Bloomington; Steven Bruce Helgeson, Lakeville, both of MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 09/837,990

(22) Filed: Apr. 19, 2001

(51) Int. Cl.[7] .............................................. F25B 41/04
(52) U.S. Cl. .............................. 62/126; 62/210; 62/217
(58) Field of Search .......................... 62/125, 126, 127, 62/129, 131, 204, 210, 211, 212, 222, 223, 224, 225, 213, 217

(56) References Cited

U.S. PATENT DOCUMENTS

| 3,794,789 A | | 2/1974 | Bynum |
|---|---|---|---|
| 3,982,664 A | | 9/1976 | Robbins et al. |
| 4,432,210 A | * | 2/1984 | Saito ............................ 62/126 |
| 4,535,598 A | * | 8/1985 | Mount .......................... 62/126 |
| 4,590,576 A | | 5/1986 | Elpiner |
| 4,694,390 A | | 9/1987 | Lee |
| 4,831,866 A | | 5/1989 | Forkert et al. |
| 4,861,231 A | | 8/1989 | Howard |
| 4,879,901 A | | 11/1989 | Leon |
| 4,936,105 A | * | 6/1990 | Takechi et al. ................ 62/129 |
| 4,938,663 A | | 7/1990 | Mitsuhashi et al. |
| 4,990,057 A | | 2/1991 | Rollins |
| 5,006,997 A | | 4/1991 | Reich |
| 5,115,643 A | * | 5/1992 | Hayata et al. ............. 62/126 X |
| 5,123,252 A | * | 6/1992 | Hanson ..................... 62/126 X |
| 5,272,647 A | | 12/1993 | Hayes |
| 5,658,131 A | | 8/1997 | Aoki et al. |
| 5,664,937 A | | 9/1997 | Takahashi et al. |
| 5,725,358 A | | 3/1998 | Bert et al. |

* cited by examiner

Primary Examiner—Harry B. Tanner
(74) Attorney, Agent, or Firm—Michael Best & Friedrich LLP (57) ABSTRACT

A method of controlling the operation of an electronic throttling valve in a temperature control unit having first and second pressure measurement devices. The method includes determining whether the first pressure measurement device is functioning, determining whether the second pressure measurement device is functioning, controlling the electronic throttling valve using data measured by both the first and second pressure measurement devices when both the first and second pressure measurement devices functioning, controlling the electronic throttling valve using data measured by only one of the first and second pressure measurement devices when the other of the first and second pressure measurement devices is determined to be non-functional, and controlling the electronic throttling valve using temperature data measured by the temperature control unit when both the first and second pressure measurement devices are determined to be non-functional.

20 Claims, 10 Drawing Sheets

ELECTRONIC THROTTLING VALVE DIAGNOSIS AND PREVENTATIVE SHUTDOWN CONTROL

FIELD OF THE INVENTION

The invention relates to transport temperature control units, and more particularly to monitoring the operation of transport temperature control units.

BACKGROUND OF THE INVENTION

Straight trucks and tractor-trailers (hereinafter referred to as "vehicles") frequently transport cargo that must be maintained at a predetermined temperature during transportation in order to preserve the quality of the cargo. Vehicles that transport such temperature-sensitive cargo have a conditioned space that is maintained at a predetermined temperature by a temperature control unit. The operation of the temperature control unit is monitored and controlled by an electronic controller.

SUMMARY OF THE INVENTION

One component of the temperature control unit is a compressor that raises the pressure of the refrigerant circulating through the temperature control unit. The mechanical throttling valve used to meter the refrigerant available to the suction end of the compressor has been replaced by an electronic throttling valve (ETV). The ETV provides a significant increase in system capacity, horsepower control, and temperature control because it can be adjusted between the fully opened position and the fully closed position with a large number of small, incremental steps. The mechanical throttling valve, on the other hand, has only a limited number of fixed positions between open and closed, and therefore does not offer the precision control available from the ETV.

The ETV is preferably controlled based on the system horsepower. For example, the ETV can be controlled based on the pressure ratio observed between the suction end of the compressor and the discharge end of the compressor. Pressure transducers at the suction end and the discharge end provide pressure data that is used by the controller to control the positioning of the ETV. If the pressure data from both the suction end and the discharge end is not available, the ETV can be controlled in other ways. For example, the ETV can be controlled based solely on suction pressure, solely on discharge pressure, or even as a function of the temperature differential across the evaporator. While these alternative control methods may not be as accurate as the preferred pressure ratio method, they are still preferable to shutting down the system until the pressure transducers can be replaced.

The present invention provides a method of monitoring the operation of the features used to control the ETV. The system analyzes whether the pressure transducers are functioning properly and, if not, switches control of the ETV to an alternative control method. These alternative control methods keep the temperature control unit running and minimize the occurrence of preventative shutdowns.

The system also monitors the functionality of the ETV itself to make sure the ETV is moving properly between the variable open and closed positions. If the system determines the ETV is stuck or otherwise non-responsive to the commands of the controller, the system determines whether the temperature control unit can still operate under these conditions or whether shutdown is needed.

Other features and advantages of the invention will become apparent to those skilled in the art upon review of the following detailed description, claims, and drawings.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

The method of the present invention is used to monitor and control the operation of an electronic throttling valve (ETV) that meters the flow of refrigerant to the suction end of a compressor used in a temperature control unit. More specifically, the compressor includes a suction end for receiving low pressure refrigerant and a discharge end for outputting high pressure refrigerant. A suction transducer measures refrigerant pressure at the suction end of the compressor and a discharge transducer measures refrigerant pressure at the discharge end of the compressor. Refrigerant is metered to the suction end of the compressor by an ETV, which is preferably controlled based on the ratio of measured suction-end pressure to measured discharge-end pressure. An example of a temperature control unit embodying the present invention is described below with respect to FIGS. 4 and 5.

This manner of controlling the operation of the ETV will be referred to as "Normal Control." Under Normal Control, the controller opens and closes the ETV incrementally in a series of small steps based on a comparison between the actual measured pressures (both suction and discharge pressures) and a desired compression ratio. For example, in the preferred embodiment, a desired compression ratio of 24 PSIG of discharge pressure to 1 PSIG of suction pressure is used. Under Normal Control, the ETV will be adjusted to maintain this 24 to 1 pressure ratio. Of course, other compression ratios can also be used. In addition, the desired compression ratio can be changed by the controller based on a number of parameters.

As described above, control of the ETV is not limited only to Normal Control, but can be controlled using alternative methods. The alternative control measures may not be as accurate as the Normal Control method, but they are well-suited for keeping the temperature control unit running. By keeping the temperature control unit running, the conditioned airspace will remain adequately conditioned to prevent spoilage of the cargo being transported.

The flow charts represented in the figures outline an algorithm in the form of a computer program that can be used to practice the method of the present invention. The program is preferably three separate, but related software routines that run at different times during operation of the temperature control unit. For purposes of description only, the three separate routines will be referred to below as the first stage, the second stage, and the third stage of the program. The method can be practiced using any device capable of storing and processing the data in the manner described below.

Figure 1A:
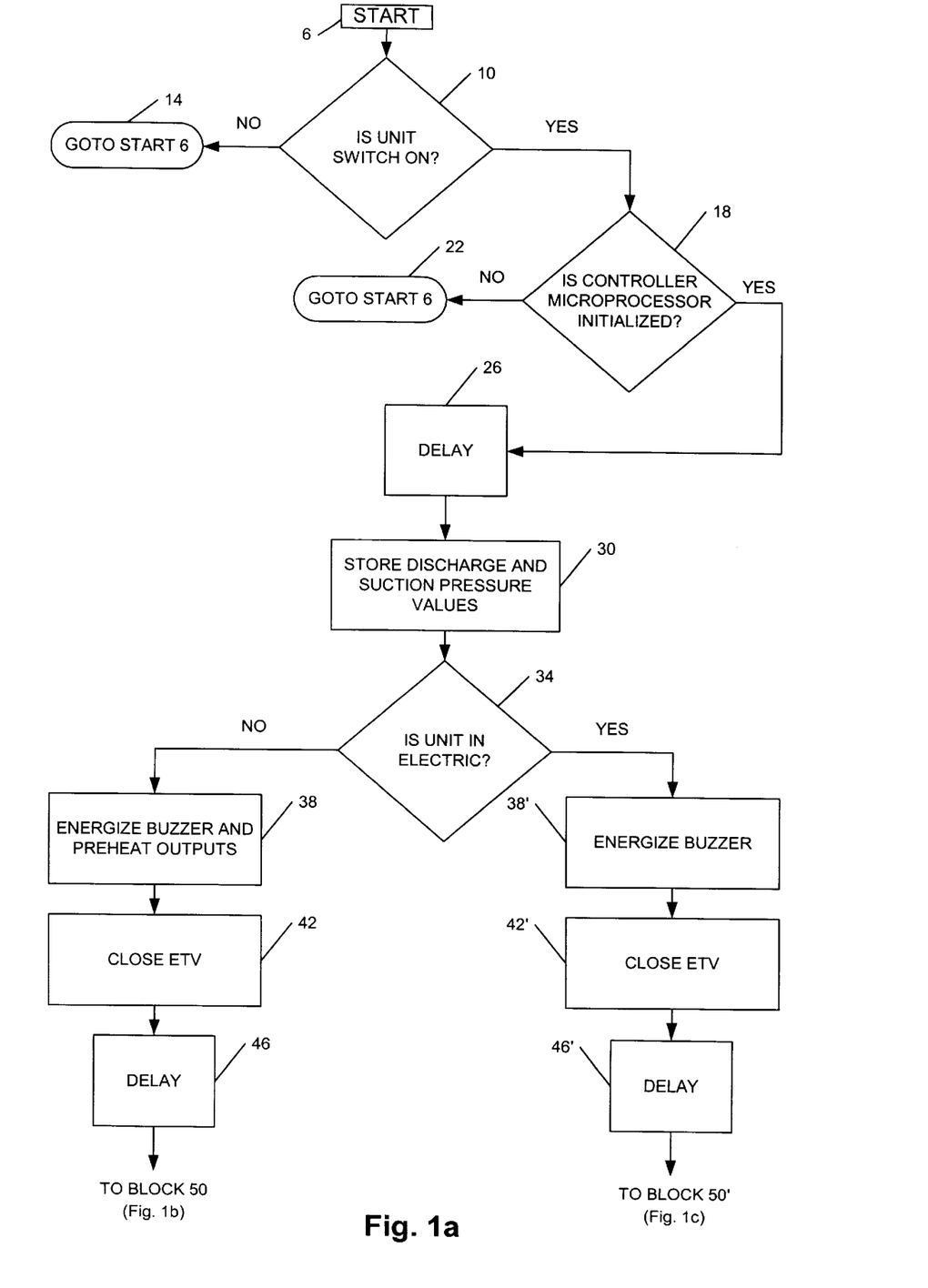
FIGS. 1a–1c are flow charts showing a first stage of a method of monitoring and controlling the operation of an electronic throttling valve according to the invention.
Figure 1B:
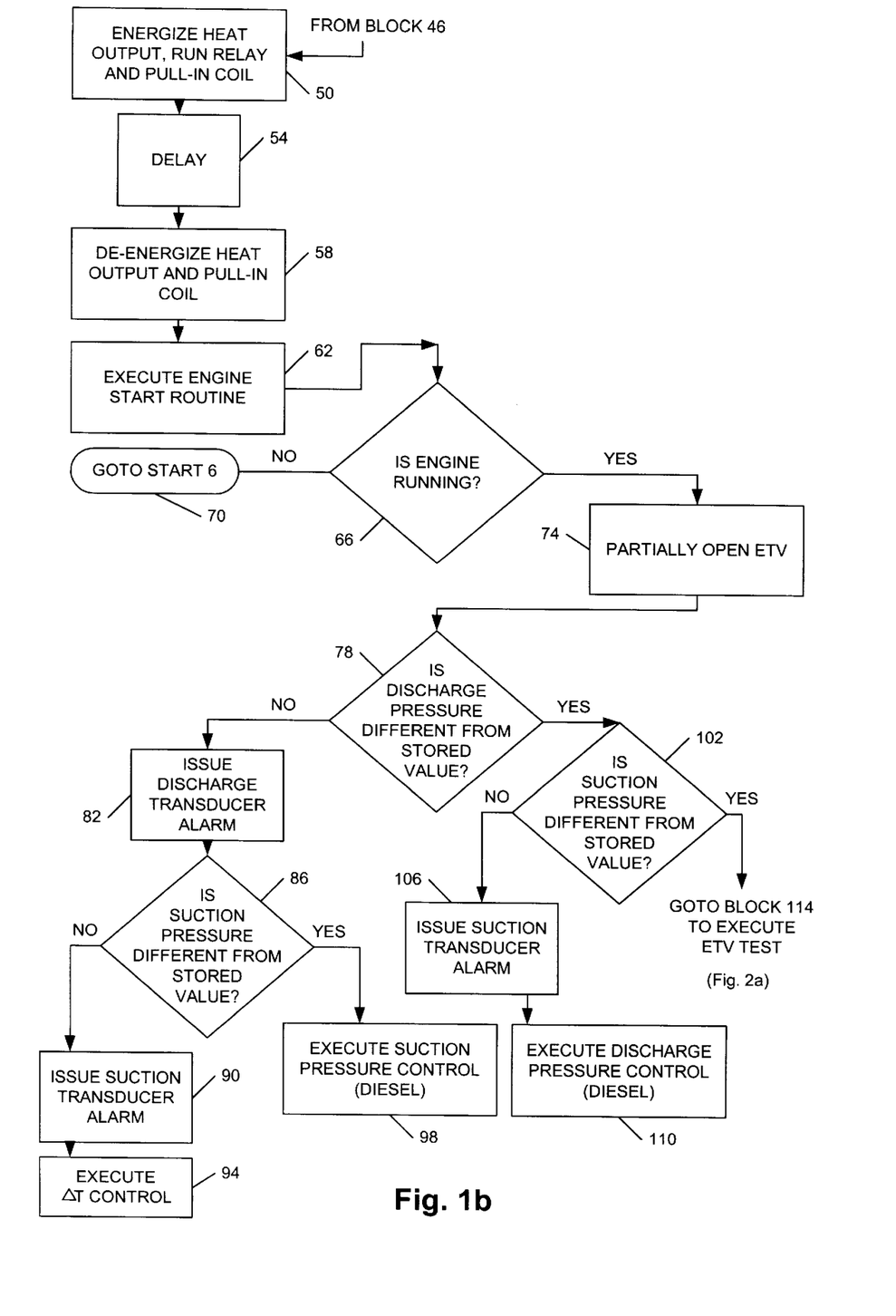
Figure 1C:
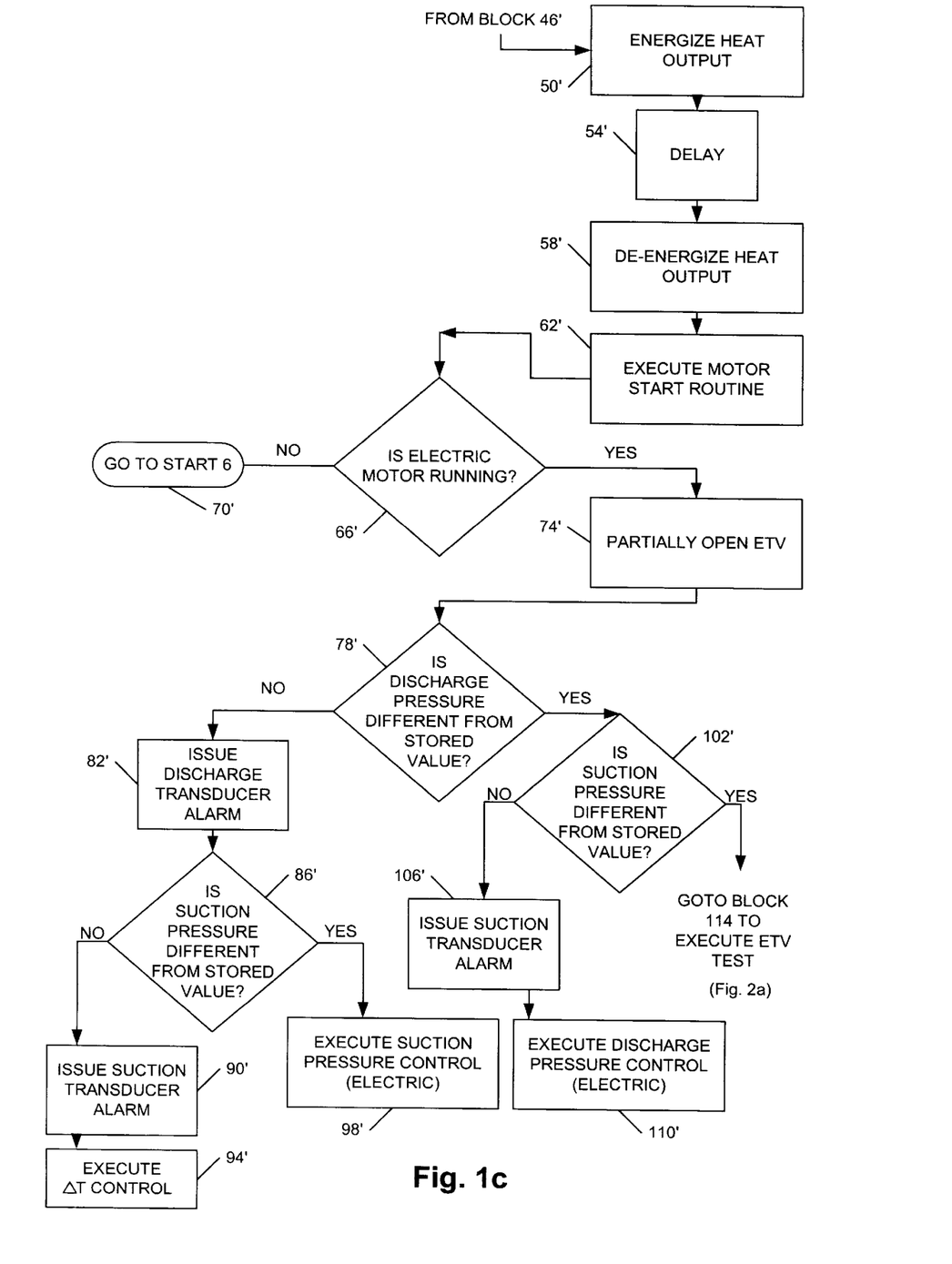

FIGS. 1a–1c illustrate the first stage of the program. In the first stage, initial testing of the pressure measurement devices occurs during a start-up routine of the temperature control unit. Each time the temperature control unit is switched on, the start-up routine is run. The initial testing stage of the program becomes another component of the overall start-up routine, which will only be described as it relates to the present invention. The basic function of the first stage is to determine whether the discharge transducer and the suction transducer are working. Depending on which, if either, of the transducers are working, the program then determines the method by which the ETV will be controlled.

As seen in FIG. 1a, the first stage of the program starts at block 6. At block 10, the program determines whether the temperature control unit is switched on. If the unit is not switched on, the program returns to start 6 at block 14. If the unit is switched on, the program proceeds to block 18 and determines whether the controller microprocessor has been initialized. In other words, whether the microprocessor has gone through its startup routine (i.e., booted-up). If the controller microprocessor is not initialized, the program returns to start 6 at block 22. If the controller microprocessor is properly initialized, the program initiates a delay at block 26. The delay accommodates various analog readings that are also being taken and that require some additional time to stabilize. In the preferred embodiment, the delay is approximately two seconds.

After the delay is complete, the program proceeds to block 30 and stores a reference discharge pressure value and a reference suction pressure value. These values are the pressure values currently observed by the discharge transducer and the suction transducer before the temperature control unit begins energizing for start-up. These reference values will vary depending on a number of factors including the amount of time the temperature control unit has been shut down, the temperature of the conditioned airspace, the ambient temperature, and the like. While the preferred embodiment uses pressure transducers, any other methods for determining pressure can be used.

Next, at block 34, the program determines whether the temperature control unit is powered by an electric motor or a diesel engine. Temperature control units are commonly powered by either electric motors or diesel engines. Because the operation of the compressor will vary depending on the type of power source (due to available horsepower limits), it is helpful for the program to determine what type of power source is being used. This determination drives some of the control parameters that will be discussed below and is made by checking the state of a switch used to activate electric power. If the switch is closed, the system is running on electric power. If the switch is open, the system is running on diesel power.

If the temperature control unit is powered by a diesel engine (NO answer at block 34), the program proceeds to block 38 and energizes the audible buzzer, alerting the operator that the start-up routine is in progress. Also in block 38, the air preheat outputs are energized to preheat the air for the diesel engine. Next, at block 42, the ETV is closed. In the preferred embodiment, this means setting the ETV to step zero. The step range for the ETV of the preferred embodiment is preferably from zero (fully closed) to eight hundred (fully opened), with overdrive room on either end of the range to ensure that the valve can be fully opened and fully closed. Of course, other step ranges can be used.

The program then continues with a delay at block 46. This delay provides time for the ETV to move to the fully closed position, which can take some time depending on where the ETV was positioned at the last shutdown and how may steps it must move to close. In the preferred embodiment, the delay at block 46 is approximately 20 seconds.

After the delay, the program proceeds to block 50 (see FIG. 1b) and the heat output, run relay, and pull-in coil of the diesel engine are energized. Energizing these components will begin to stabilize and equalize the pressures being observed at the suction end and at the discharge end of the compressor. At this point, the pressures observed by the discharge and suction transducers should already be different from the reference values stored in block 30. The program runs another delay at block 54 while the components are energized. At block 58, the heat output and the pull-in coil are de-energized.

Next, the engine start routine is executed at block 62 and the engine starts. When the engine starts, the actual suction and discharge pressures will change drastically due to the operation of the compressor. This change in pressure will be observed by the pressure transducers if they are functioning properly. At block 66 the program verifies that the engine has started and is running. If the engine did not start (NO answer at block 66), the program returns to start 6 at block 70. If the engine is running (YES answer at block 66), the ETV valve is partially opened at block 74. In the preferred embodiment, the ETV is set to approximately step 120, however any appropriate step setting can be used. Opening the ETV should cause a further change in the pressure readings observed by both of the transducers. At block 78, the program determines whether discharge pressure currently being observed is different from the stored reference discharge pressure.

If the answer at block 78 is NO, meaning that the measured discharge pressure has not changed a predetermined amount from the reference discharge pressure, the discharge transducer is not functioning properly. In the preferred embodiment, the predetermined amount of change for the discharge pressure is plus or minus 5 PSIG. Of course, other ranges can be substituted. The discharge transducer might be non-functional for any number of reasons, including a faulty transducer, wiring defects, or controller input defects. Whatever the reason, a discharge transducer alarm is issued at block 82 to alert the operator that the discharge transducer is not functioning properly.

As mentioned above, the ETV can still be controlled by alternative methods when the discharge transducer is not functioning. From block 82, the program proceeds to block 86, where the program checks whether the suction pressure currently being observed is different from the stored reference suction pressure. If the answer at block 86 is NO, meaning that the measured suction pressure has not changed a predetermined amount from the reference suction pressure, the suction transducer is non-functional. In the preferred embodiment, the predetermined amount of change for the discharge pressure is plus or minus 10 PSIG. Of course, other ranges can be substituted. The suction transducer might be non-functional for any of the reasons discussed above with respect to the discharge transducer. Whatever the reason, a suction transducer alarm is issued at block 90 to alert the operator that the suction transducer is not functioning.

If the program reaches block 90, neither the discharge nor the suction transducers are functioning properly. When this occurs, control of the ETV is changed over to "ΔT Control" at block 94. ΔT Control can be used until the operator repairs the non-functioning suction and discharge transducers.

ΔT Control involves using the change in temperature measured across the evaporator of the temperature control unit to control the position of the ETV. More specifically, the controller sets the position of the ETV to maintain a ΔT below a predetermined maximum value. ΔT is defined as the difference between the ambient temperature outside the trailer and the temperature of the air returning to the evaporator from inside the conditioned airspace. Therefore, the controller sets the ETV to a position that should keep the difference between the ambient temperature and the return air temperature below a predetermined maximum value. Other temperature values, such as discharge air temperature, could be used in place of the return air temperature. Of course, this would necessitate changing the predetermined ΔT values.

Table 1 illustrates the preferred predetermined maximum ΔT values for a variety of temperature conditions when the temperature control unit is in the cooling mode. Of course, other predetermined ΔT values can be substituted.

TABLE 1

| AMBIENT TEMP. | RETURN AIR TEMP. | ΔT MAX |
| --- | --- | --- |
| ≧80 degrees F. | ≧80 degrees F. | 12.0 degrees F. |
| ≧60 degrees F. | ≧60 degrees F. | 11.0 degrees F. |
| ≧40 degrees F. | ≧40 degrees F. | 10.0 degrees F. |
| ≧15 degrees F. | ≧15 degrees F. | 8.5 degrees F. |
| ≧0.0 degrees F. | ≧0.0 degrees F. | 5.0 degrees F. |
| ≦−0.1 degrees F. | ≦−0.1 degrees F. | 4.0 degrees F. |

Table 2 illustrates the preferred predetermined maximum ΔT values for a variety of temperature conditions when the temperature control unit is in the heating mode. Again, other ΔT values can be substituted.

TABLE 2

| AMBIENT TEMP. | RETURN AIR TEMP. | ΔT MAX |
| --- | --- | --- |
| ≧15 degrees F. | ≧15 degrees F. | 8.0 degrees F. |
| ≦15 degrees F. | ≦15 degrees F. | 8.0 degrees F. |

If the temperature control unit is in the defrosting mode, a conservative ETV position can be selected and maintained without the need to monitor ΔT. In the preferred embodiment, the ETV is set to approximately one quarter open. Of course, the ETV can alternatively be controlled by monitoring ΔT during the defrost mode, as described above with respect to cooling and heating modes.

Returning now to block 86, if the program determines that the suction transducer is functioning (YES answer at block 86), control of the ETV is switched over to "Suction Pressure Control" at block 98. Suction Pressure Control is another alternative method of controlling the ETV based only on the measured suction pressure. Recall that at block 86, it has been determined that the discharge transducer is not functioning, and therefore, measured discharge pressure values are not available for controlling the ETV.

With Suction Pressure Control, the controller positions the ETV based only on the pressure measured at the suction-end of the compressor. A desired maximum suction pressure value is set, and the controller compares that desired maximum suction pressure value to the actual suction pressure measured by the suction transducer. The ETV is positioned by the controller while keeping the actual suction pressure at or below the desired maximum suction pressure setting. In the preferred embodiment, the desired maximum suction pressure setting for Suction Pressure Control is approximately 24 PSIG. Of course other pressure settings can also be used and will vary depending on the application and the type of refrigerant being used.

Returning now to block 78, if the program determines that the measured discharge pressure is significantly different from the stored reference discharge pressure (YES answer at block 78), the discharge transducer is functioning properly. The program then proceeds to block 102 to determine if the suction transducer is functioning properly. As described with respect to block 86, at block 102 the program checks whether the measured suction pressure is different from the stored reference suction pressure.

If the answer at block 102 is NO, meaning that the measured suction pressure has not changed a predetermined amount from the reference suction pressure, the suction transducer is determined to be non-functional. A suction transducer alarm is issued at block 106 to alert the operator that the suction transducer is not functioning. If the program reaches block 106, it has been determined that the discharge transducer is functioning but the suction transducer is not. The program proceeds to block 110 where control of the ETV is switched over to "Discharge Pressure Control." Discharge Pressure Control is another alternative method of controlling the ETV based only on the measured discharge pressure.

With Discharge Pressure Control, the controller positions the ETV based only on the pressure measured at the discharge-end of the compressor. A desired maximum discharge pressure value is set and the controller compares that desired maximum discharge pressure value to the actual discharge pressure measured by the discharge transducer. The ETV is positioned by the controller while keeping the actual discharge pressure at or below the desired maximum discharge pressure setting. In the preferred embodiment, the desired maximum discharge pressure setting for Discharge Pressure Control is approximately 350 PSIG. Of course other pressure settings can also be used and will vary depending on the application and the type of refrigerant being used.

Returning to block 102, if the program determines that the suction transducer is functioning properly (YES answer at block 102), then both the discharge transducer and the suction transducer are functioning properly. Since both transducers are functioning properly, the preferred method of controlling the ETV using Normal Control can be used. A YES answer at block 102 moves the program to the second stage, beginning at block 114. The second stage is described in detail below with respect to FIGS. 2a and 2b.

The preceding description of the first stage has described the flow of the program when the temperature control unit is powered by a diesel engine (i.e., NO answer at block 34). If the answer at block 34 is YES (i.e., the system uses an electric motor), the program proceeds in a manner that mirrors the previously described operations in the diesel engine operated branch of FIGS. 1*a* and 1*b*. Program operations shown in FIGS. 1*a* and 1*c* that occur in electric motor operated branch of the program have been given prime (') reference numbers corresponding to operations previously described in the diesel engine operated branch. Unless discussed below, the operations in the electric motor operated branch of the program are substantially the same as the corresponding operations previously described.

For example, in block 38' (see FIG. 1*a*), there is no energization of the preheat outputs since the electric motor does not require such preheating. Likewise, in blocks 50' and 58' (see FIG. 1*c*) there is no energization or de-energization of any run relay or pull-in coils since those components are specific to diesel engines. Additionally, in block 62' the electric motor start routine is different from the diesel engine start routine of block 62.

The other major differences are the preferred desired maximum settings used for operating under Suction Pressure Control and Discharge Pressure Control. Because the electric motor does not have the horsepower capabilities of the diesel engine, the desired maximum suction and discharge pressure settings are lower than those selected in the diesel engine operated branch of the program. In the preferred embodiment, the desired maximum suction pressure setting in block 98' is approximately 18 PSIG and the desired maximum discharge pressure setting in block 110' is approximately 300 PSIG.

Figure 2A:
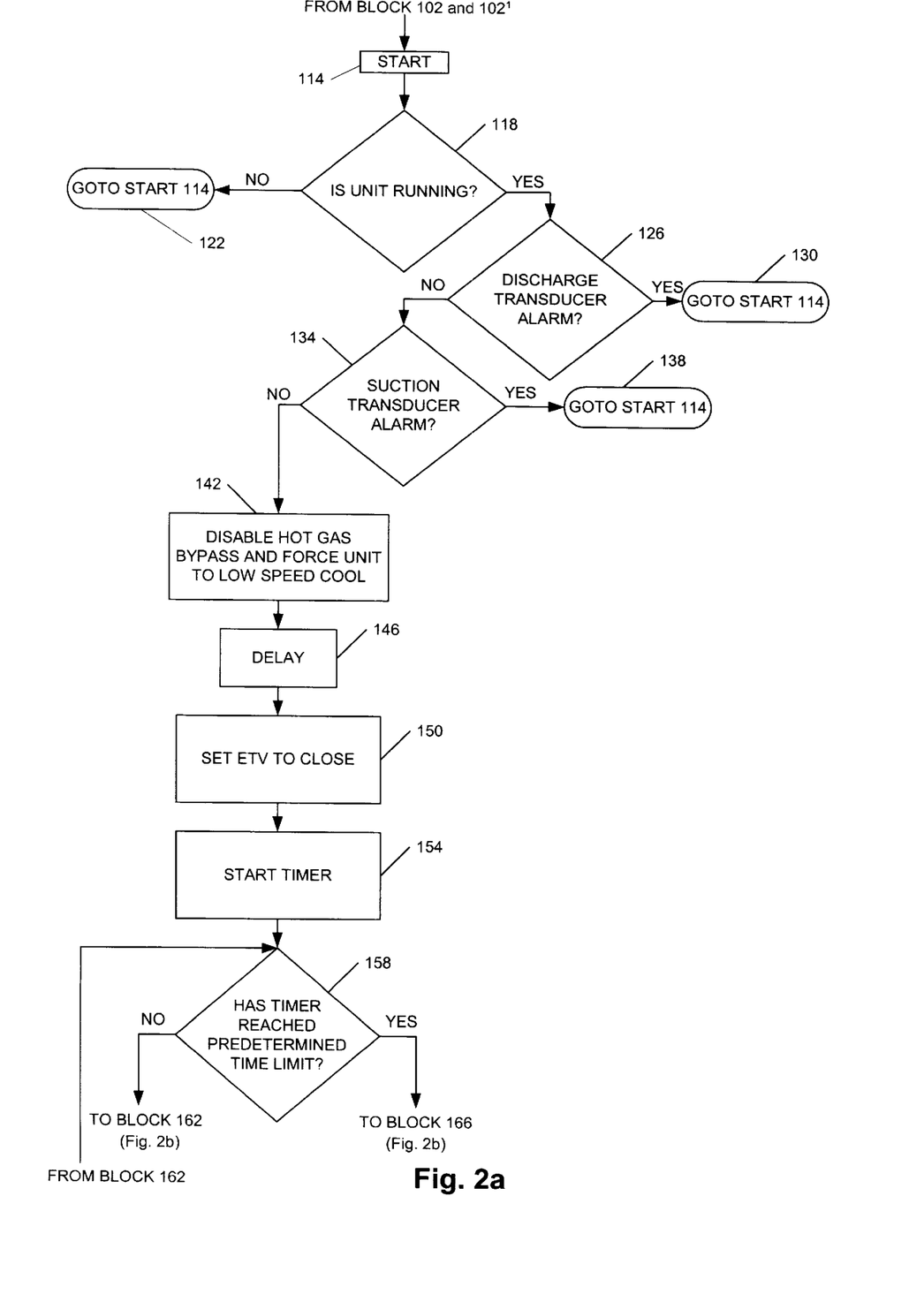
FIGS. 2a and 2b are flow charts showing a second stage of the method of monitoring and controlling the operation of an electronic throttling valve according to the invention.
Figure 2B:
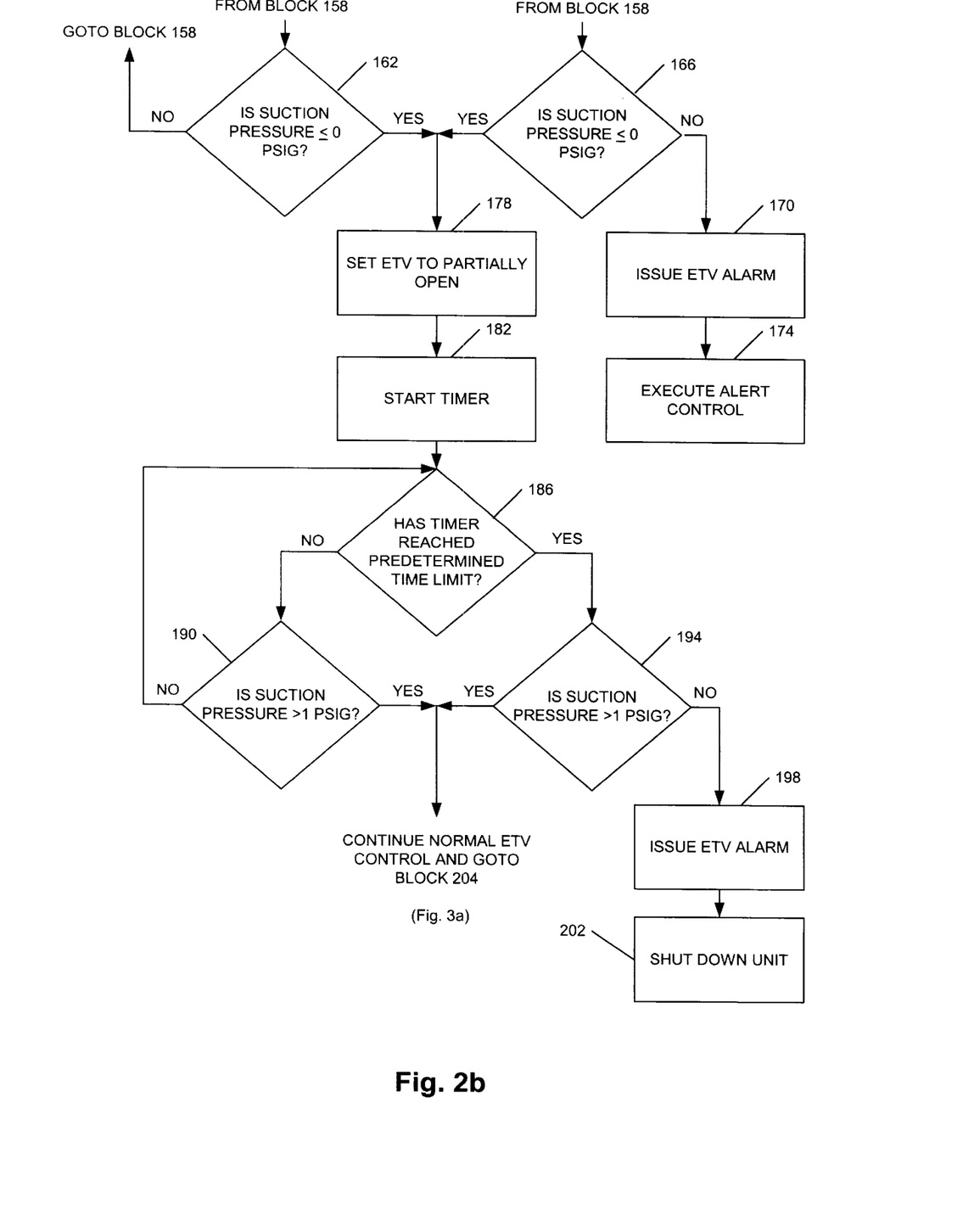

Once the first stage is completed and the program has determined that the preferred method of controlling the ETV using Normal Control will be used, the program proceeds to the second stage illustrated in FIGS. 2*a* and 2*b*. In the second stage, the program tests the functionality of the ETV itself to make sure that the ETV responds to the commands given by the controller. In other words, the program tests the ETV to be sure that it properly opens and closes. If the ETV is stuck or is otherwise not responding, the program determines if the temperature control unit can continue operating under the existing condition or whether shutdown is required.

Prior to discussing the second stage, it is worth noting that the first stage of the program includes moving the ETV between a closed and a partially opened position while determining if the transducers are functioning properly. For the purposes of the first stage, it is assumed that the ETV actually moves, however, movement of the ETV during stage one is not required to determine that the transducers are functioning properly. Rather, the act of starting the engine or electric motor alone (thereby starting the compressor) is enough to cause significant pressure changes that should be detected by the transducers. Therefore, lack of movement of the ETV during stage one will not adversely affect the transducer tests.

Referring to FIG. 2*a*, the second stage starts at block 114 and the program determines whether the temperature control unit is running at block 118. If the unit is not running, the program returns to start 114 at block 122. If the unit is running, the program checks for a discharge transducer alarm at block 126. If there is a discharge transducer alarm, the discharge transducer is not functioning and the program returns to start 114 at block 130. If there is no discharge transducer alarm, the program proceeds to block 134 and checks for a suction transducer alarm. If there is a suction transducer alarm, the suction transducer is not functioning and the program returns to start 114 at block 138. Therefore, blocks 126 and 134 verify the results of stage one and ensure that both transducers are functioning properly. Recall that if one or both transducers are not functioning properly, an alternative method of controlling the ETV should be in use and the program should not be in stage two.

After verifying the functionality of the transducers, the program sets the unit for warm-up by disabling the hot gas bypass and forcing the unit into a low speed cooling mode at block 142. At block 146 the program enters a delay to let the temperature control unit properly warm up. In the preferred embodiment, the delay is approximately two minutes.

Next, the ETV is set to close at block 150. In the preferred embodiment this means setting the ETV to step zero or lower. If the ETV is functioning properly, it should close in response to this step setting, and the measured suction pressure should be less than or equal to zero PSIG. A timer that is set to a predetermined time limit is started at block 154 to let the system stabilize in response to closing the ETV. In the preferred embodiment, the predetermined time limit is one minute, but other limits can also be used.

Block 158 operates periodically during the operation of the timer to check if the timer has reached its predetermined time limit. If the timer has not reached its predetermined time limit (NO answer at block 158), the program proceeds to block 162 (see FIG. 2*b*) and checks the suction pressure measured by the suction transducer to see if the measured suction pressure is less than or equal to zero PSIG. If the suction pressure has not yet reached zero PSIG (NO answer at block 162), the program loops back to block 158 where it will repeat through blocks 158 and 162 until either the predetermined time limit is reached or the suction pressure reaches zero PSIG. If the suction pressure reaches zero PSIG before the predetermined time limit is reached (YES answer at block 162), the ETV has properly moved to the fully closed position and is at least partly functional. The program proceeds to block 178, which will be described below.

If and when the predetermined time limit is reached (YES answer at block 158), block 166 (see FIG. 2*b*) checks whether the suction pressure has reached zero PSIG or lower. If YES, the ETV is fully closed and the program proceeds to block 178. If the suction pressure has not reached zero PSIG by the time the predetermined time limit is reached (NO answer at block 166), the ETV is not functioning properly and an ETV alarm is issued at block 170 to alert the operator.

The program knows the ETV is not functioning properly because by this time, a suction pressure of less than or equal to zero PSIG should have been reached had the ETV moved to the fully closed position. Because the predetermined time limit expired and the suction pressure did not reach zero PSIG, the ETV must be stuck in an open position.

After the ETV alarm is issued at block 170, the program switches to Alert Control operation at block 174. Under Alert Control, the temperature control unit can continue to run, but is closely monitored. Alert Control operation is known to those skilled in the art, and is well-suited for monitoring the continued operation of the temperature control unit under circumstances such as a stuck ETV. The temperature control unit will continue to run even with the ETV stuck in the partially open position as long as the system can meet the required capacity demands. If the unit cannot produce the desired capacity, or the operation of the compressor or the system stability is jeopardized, the Alert Control will shut down the temperature control unit.

If the program determines that the ETV is fully closed (YES answer at block 162 or 166), the ETV is set to partially open at block 178 to see if the ETV will open from the closed position. In the preferred embodiment this means setting the ETV to approximately step 120 when the ambient or return air is greater than ten degrees Fahrenheit or to approximately step 200 when the ambient or return air is less than ten degrees Fahrenheit. Of course, other settings can also be used. If the ETV is functioning properly, it should open in response to these step settings and the measured suction pressure should become greater than zero PSIG.

Again, a timer set to a predetermined time limit is started at block 182 to let the system stabilize in response to opening the ETV. In the preferred embodiment, the predetermined time limit is one minute, however, other limits can also be used.

Block 186 operates periodically during the operation of the timer and checks if the timer has reached its predetermined time limit. If the timer has not reached its predetermined time limit (NO answer at block 186), the program proceeds to block 190 and checks the suction pressure measured by the suction transducer to see if the measured suction pressure is greater than one PSIG. If the suction pressure has not yet gone above one PSIG (NO answer at block 190), the program loops back to block 186 where it will repeat through blocks 186 and 190 until either the predetermined time limit is reached or the suction pressure exceeds one PSIG. If the suction pressure exceeds one PSIG before the predetermined time limit is reached (YES answer at block 190), the ETV has properly moved to the partially opened position and is fully functional. The program proceeds to stage three at block 204 and continues with Normal Control of the ETV. Stage three of the program will be described below.

If and when the predetermined time limit is reached (YES answer at block 186), block 194 checks whether the suction pressure has exceeded one PSIG. If YES, the ETV is at least partially opened and the program proceeds to block 204. If the suction pressure has not exceeded one PSIG by the time the predetermined time limit is reached (NO answer at block 194), the ETV is not functioning properly and an ETV alarm is issued at block 198. The temperature control unit is then shut down at block 202.

The program knows the ETV is not functioning properly because a suction pressure greater than one PSIG should have been reached had the ETV moved to a partially opened position. Because the predetermined time limit expired and the suction pressure did not exceed one PSIG, the ETV must be stuck in the closed position. The system must be shut down at this point because the temperature control unit cannot operate under the vacuum conditions present in the compressor when the ETV is stuck in the closed position.

Figure 3A:
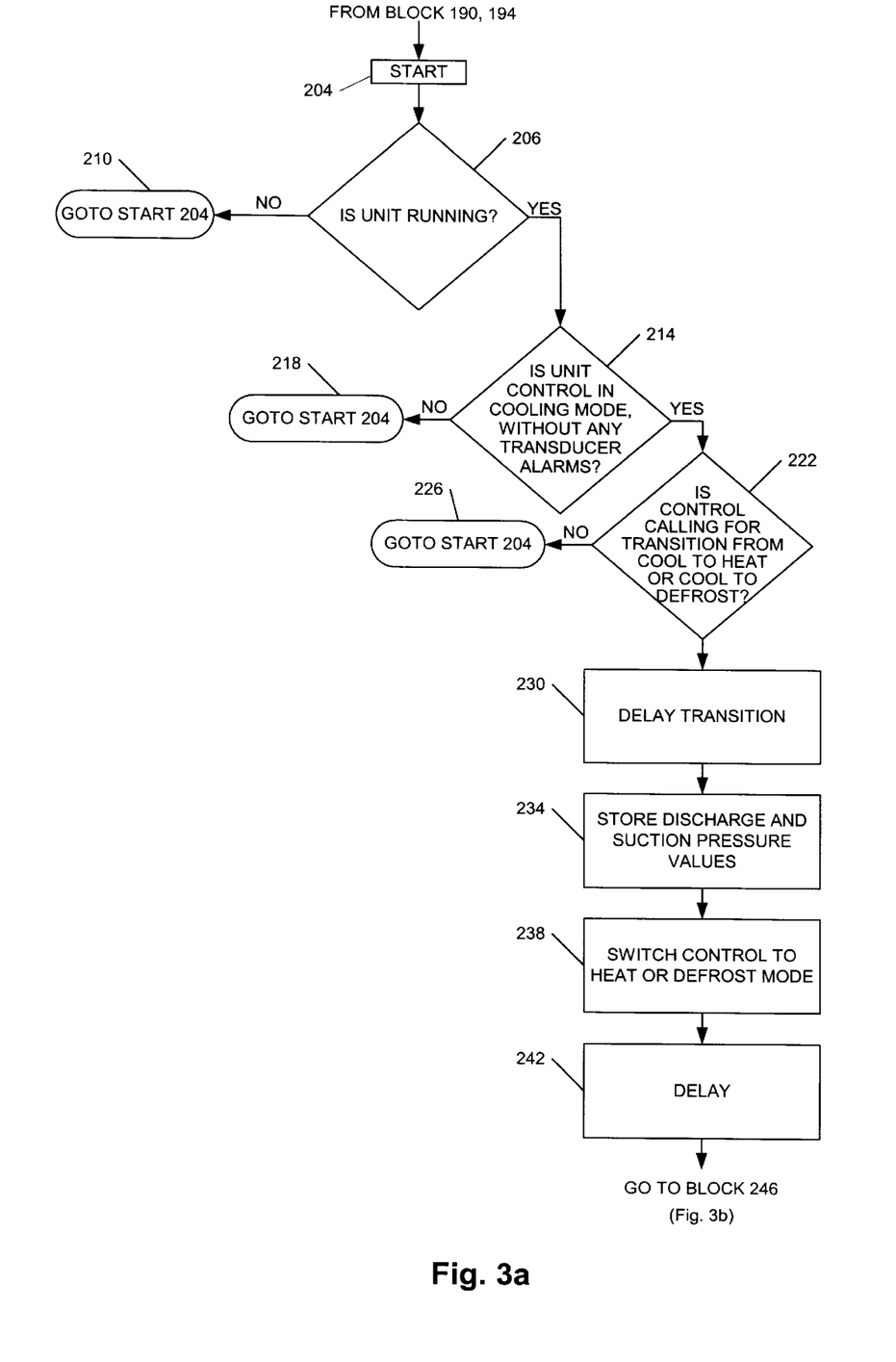
FIGS. 3a–3c are flow charts showing a third stage of the method of monitoring and controlling the operation of an electronic throttling valve according to the invention.
Figure 3B:
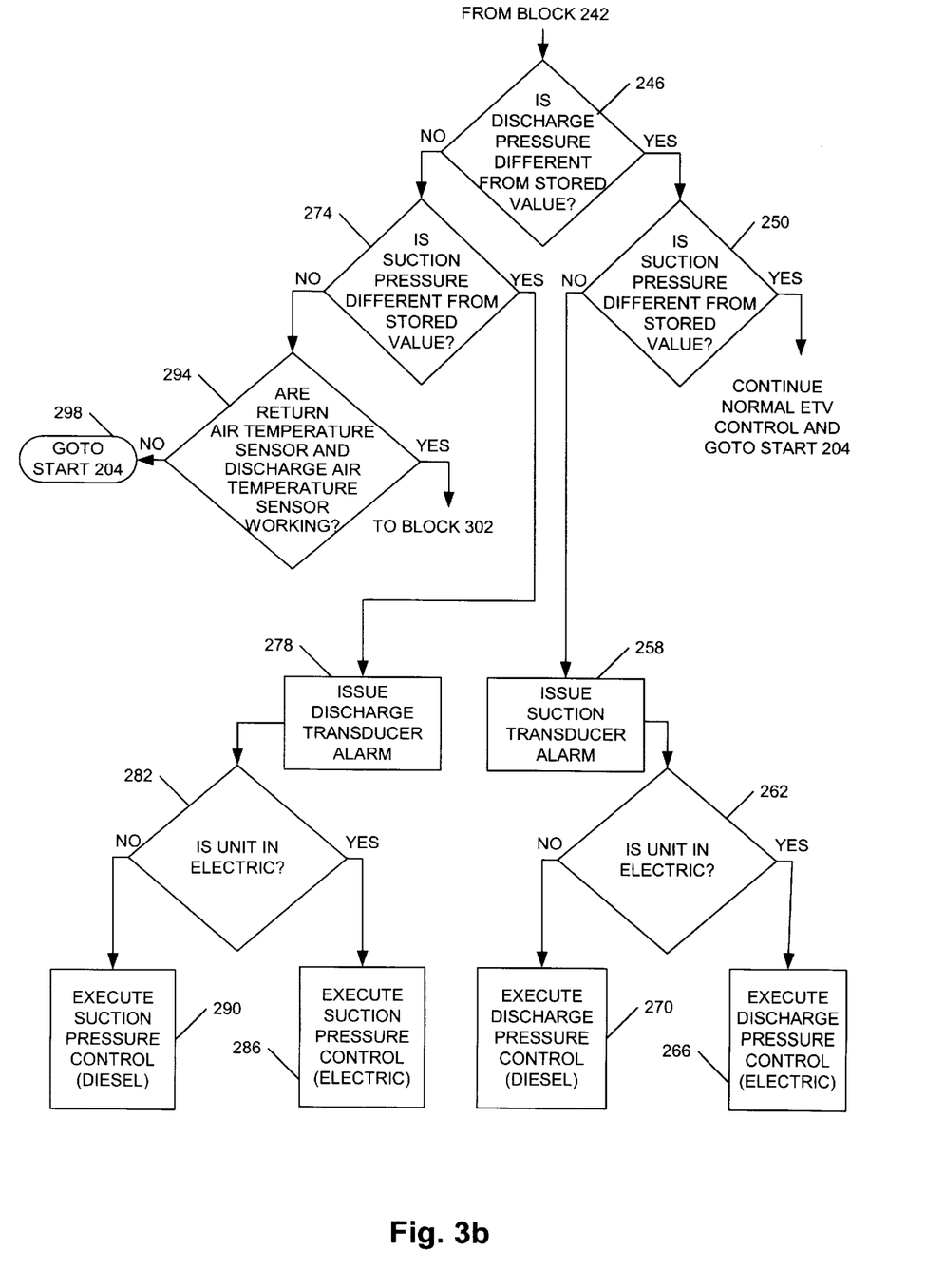
Figure 3C:
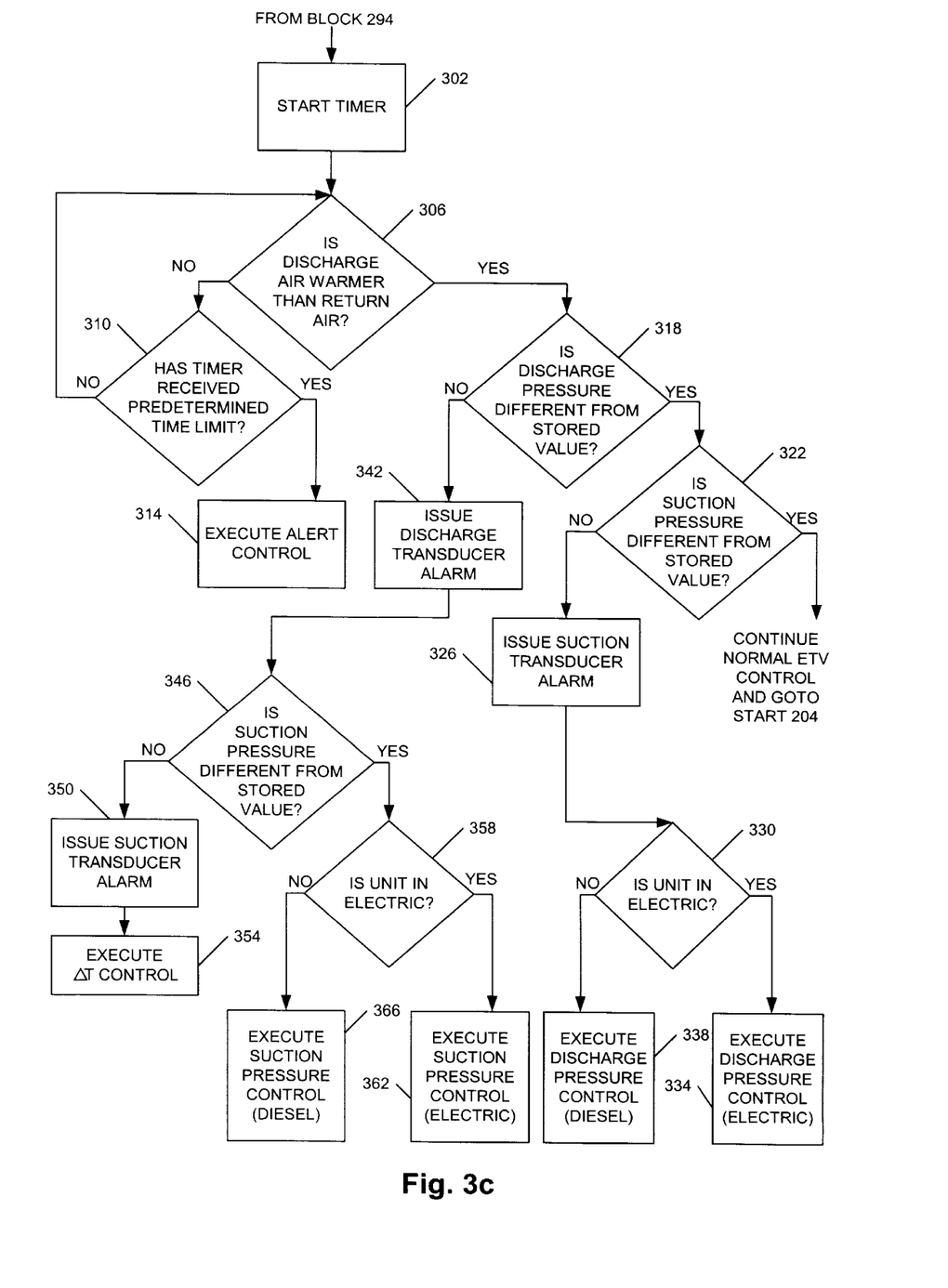

Once the second stage is completed and the program has determined that the ETV is functioning properly, the program proceeds to the third stage illustrated in FIGS. 3a–3c. If the program reaches the third stage, the ETV is operating under Normal Control because the ETV itself, and both the discharge and suction transducers are functioning properly.

In the third stage, the program continues monitoring the functionality of the suction and discharge transducers to be sure that the ETV can continue being operated under Normal Control. In other words, the program runs additional tests (similar to those run in stage one) to be sure that the transducers continue to function properly while the temperature control unit is running. If either or both of the transducers fail during operation of the unit, stage three of the program switches the control of the ETV to an alternative control method. In the preferred embodiment, the testing in stage three occurs each time the unit transitions from a cooling mode to a heating or a defrosting mode. Of course, testing need not occur at every such transition, and additionally and/or alternatively, the testing could occur during transitions from the heating or defrosting mode to the cooling mode.

With regard to FIG. 3a, the third stage starts at block 204 and then the program verifies that the temperature control unit is running at block 206. This verification proceeds regardless of whether the unit is under diesel or electric power. If the unit is not running (NO answer at block 206), the program returns to start 204 at block 210. If the unit is running (YES answer at block 206), the program proceeds to block 214 and verifies that the unit is operating in the cooling mode and that no transducer alarms have been issued.

A NO answer at block 214 means that the unit is not operating in the cooling mode, a transducer alarm has been issued, or both, and the program returns to start 204 at block 218. With a YES answer at block 214, the program proceeds to block 222 where it determines whether the controller is calling for a transition from cooling to heating (i.e., either from cooling mode to heating mode or from cooling mode to defrost mode). If the answer at block 222 is NO, the program returns to start 204 at block 226. If the controller is calling for a transition from cooling to heating (YES answer at block 222), the program continues by delaying the transition at block 230, thereby allowing the program to store current discharge and suction pressure values at block 234 prior to the actual transition. The delay at block 230 provides time to store stable suction and discharge pressure values prior to the transition. The delay time can vary depending on the speed of the processor in the controller, and in the preferred embodiment is approximately two seconds.

Next, the program switches the controller to either heat or defrost mode at block 238 to effectuate the transition. Another delay follows at block 242 to allow time for the transition to occur. In the preferred embodiment, the delay time is approximately five seconds, but can be varied as desired. After the delay, the transition from cooling to heating should have occurred. This transition should result in pressure changes at both the suction end and the discharge end of the compressor.

At block 246 (see FIG. 3b), the program determines whether the discharge pressure currently being observed after the transition is different from the discharge pressure stored at block 234. If the answer at block 246 is YES, the measured discharge pressure has changed a predetermined amount from the stored discharge pressure and the discharge transducer is functioning properly. In the preferred embodiment, the predetermined amount of change for the discharge pressure is plus or minus 5 PSIG. Of course, other ranges can be substituted.

The program then proceeds to block 250 and determines whether the suction pressure currently being observed after the transition is different from the suction pressure stored at block 234. If the answer at block 250 is YES, the measured suction pressure has changed a predetermined amount from the stored suction pressure and the suction transducer is also working. In the preferred embodiment, the predetermined amount of change for the discharge pressure is plus or minus 5 PSIG. Of course, other ranges can be substituted.

After determining that both transducers are functioning properly, the program continues operating under Normal Control and repeats the previous steps of stage three at the next transition from cooling to heating. If the temperature control unit is shut down, the program will return to stage one when the unit is switched on again.

If the answer at block 250 is NO, meaning that the measured suction pressure has not changed a predetermined amount from the reference suction pressure, the suction transducer is determined to be non-functional. A suction transducer alarm is issued at block 258 to alert the operator that the suction transducer is not functioning. The program then determines if the unit is operating under electric power at block 262. If the unit is powered by an electric motor (YES answer at block 262), the program switches to electric Discharge Pressure Control at block 266. If the unit is powered by a diesel engine (NO answer at block 262), the program switches to diesel Discharge Pressure Control at block 270.

Recall from above that the difference between diesel Discharge Pressure Control and electric Discharge Pressure Control is that different predetermined maximum discharge pressure settings are employed in the controls. The predetermined maximum discharge pressure setting for diesel-powered units is higher in light of the higher horsepower capacity.

Returning to block 246, if the discharge pressure measured after the transition is not significantly different from the discharge pressure stored at block 234, the discharge pressure transducer may not be functioning properly. However, the program cannot tell for certain that the discharge transducer is non-functional without first attempting to verify that the transition between cooling and heating actually took place. To do this, the program continues to block 274 and determines whether the suction pressure currently being observed after the transition is different from the suction pressure stored at block 234. If the answer at block 274 is YES, the measured suction pressure has changed a predetermined amount from the stored suction pressure and the suction transducer is working.

Because the suction transducer registered a change at block 274, the program determines that the transition must have occurred. But because the discharge transducer tested at block 246 did not register a change, the discharge transducer must be non-functional. The program issues a discharge transducer alarm at block 278 to alert the operator that the discharge transducer is not functioning. The program then determines if the unit is operating under electric power at block 282. If the unit is powered by an electric motor (YES answer at block 282), the program switches to electric Suction Pressure Control at block 286. If the unit is powered by a diesel engine (NO answer at block 282), the program switches to diesel Suction Pressure Control at block 290.

Again, the difference between diesel Suction Pressure Control and electric Suction Pressure Control is the different desired maximum discharge pressure settings. The desired maximum suction pressure setting for diesel-powered units is higher in light of the higher horsepower capacity.

Returning to block 274, if the program determines that the measured suction pressure is not significantly different from the suction pressure stored at block 234 (NO answer at block 274), there may be a problem with the suction transducer. However, if the program observes a NO answer at block 274, then neither the discharge transducer nor the suction transducer has registered a pressure change in light of the expected transition from cooling to heating. This could mean that both the suction and discharge transducers have failed, but more likely it means that the expected transition did not actually occur.

Often times during the cooling mode, moisture will collect and freeze in the expansion valve. When the unit transitions to the heating mode, hot gases traveling through the expansion valve are blocked by the frozen moisture in the expansion valve, and therefore, the transition to the heating mode will be delayed. Until the frozen moisture in the valve is melted by the hot gas, the compressor may not undergo the expected pressure changes and the unit will not begin discharging heated air. This is one possible explanation as to why neither transducer registered a pressure change. There could also be other explanations, which will not be described further.

In light of the possible delay, the program attempts to determine if the transition actually occurred by checking the temperatures of the return air and the discharge air. The program proceeds to block 294 and checks to see if the return air temperature sensor and the discharge air temperature sensor are working. This involves checking to see whether alarms have been issued for either of the temperature sensors. If the temperature sensors are not working (NO answer at block 294), the program returns to start 204 at block 298. If the temperature sensors are working (YES answer at block 294), the program can use temperature data to determine whether the transition from cooling to heating has actually occurred. A timer is started at block 302 (see FIG. 3c). The timer is set for a predetermined amount of time, in which the transition from cooling to heating should occur even if the hot gases have to melt through the frozen moisture in the expansion valve. In the preferred embodiment, the timer is set for approximately five minutes, however other times can be used.

At block 306, the program checks to see if warm air is being discharged into the conditioned airspace, thereby indicating that the transition to heating has occurred. While numerous methods could be used at block 306, in the preferred embodiment, the program checks to see if the return air is at least two degrees cooler than the discharge air.

A NO answer at block 306 indicates that the transition from cooling to heating has not yet occurred. The program then proceeds to block 310 and checks to see whether the timer of block 302 has reached the predetermined time limit. If the timer has reached the predetermined time limit (YES answer at block 310), the transition did not occur as expected and the program switches over to Alert Control at block 314. As described above, Alert Control operates to keep the unit running under conservative control if possible, or shuts the unit down if necessary.

If, at block 310, it is determined that the timer has not reached the predetermined time limit (NO answer at block 310), the program loops back to block 306 and continues monitoring. If the program receives a YES answer at block 306, meaning that the return air is at least two degrees cooler than the discharge air (i.e., hot air is being discharged into the conditioned airspace), the program knows that the transition has occurred properly and proceeds to check the discharge transducer at block 318.

If the measured discharge pressure is significantly different from the discharge pressure stored at block 234 (YES answer at block 318), the discharge transducer is working and the program proceeds to block 322 to check the suction transducer. If the measured suction pressure is significantly different from the suction pressure stored at block 234 (YES answer at block 322), both transducers are operating properly and the program returns to block 204 and waits for the next transition to occur.

If, at block 322, the measured suction pressure is not significantly different from the stored suction pressure (NO answer at block 322), the suction transducer is not functioning properly and a suction transducer alarm is issued at block 326. The program then determines if the unit is operating under electric power at block 330. If the unit is powered by an electric motor (YES answer at block 330), the program switches to electric Discharge Pressure Control at block 334. If the unit is powered by a diesel engine (NO answer at block 330), the program switches to diesel Discharge Pressure Control at block 338.

Returning to block 318, if the discharge pressure is not significantly different from the stored discharge pressure (NO answer at block 318), the discharge transducer is not functioning properly and the program issues a discharge transducer alarm at block 342. Next, at block 346, the program determines if the suction transducer is functioning properly. If, at block 346, the measured suction pressure is not significantly different from the stored suction pressure (NO answer at block 346), the suction transducer is not functioning properly and a suction transducer alarm is issued at block 350. Because neither transducer is working properly, the program switches to ΔT Control at block 354.

If, on the other hand, the suction transducer is working properly (YES answer at block 346), the program determines if the unit is operating under electric power at block 358. If the unit is powered by an electric motor (YES answer at block 358), the program switches to electric Suction Pressure Control at block 362. If the unit is powered by a diesel engine (NO answer at block 358), the program switches to diesel Suction Pressure Control at block 366.

The above-described invention provides a useful and reliable method for monitoring and controlling the operation of the ETV under a large variety of circumstances. As stated throughout the previous description, the specific details of the program (e.g., the delay intervals, the pressure limits, the temperature limits, the timer limits, the temperature measurement techniques, the transitions used, and the like) are not critical to the operation of the program and can be varied to suit the specific temperature control unit and the desired operating parameters. In addition, the program can be expanded or reduced. For example, it is not necessary to use stage three of the program if continuous monitoring of the transducers is not desired. Alternatively, stage three could be expanded to additionally test the transducers at transitions from heating to cooling.

Figure 4:
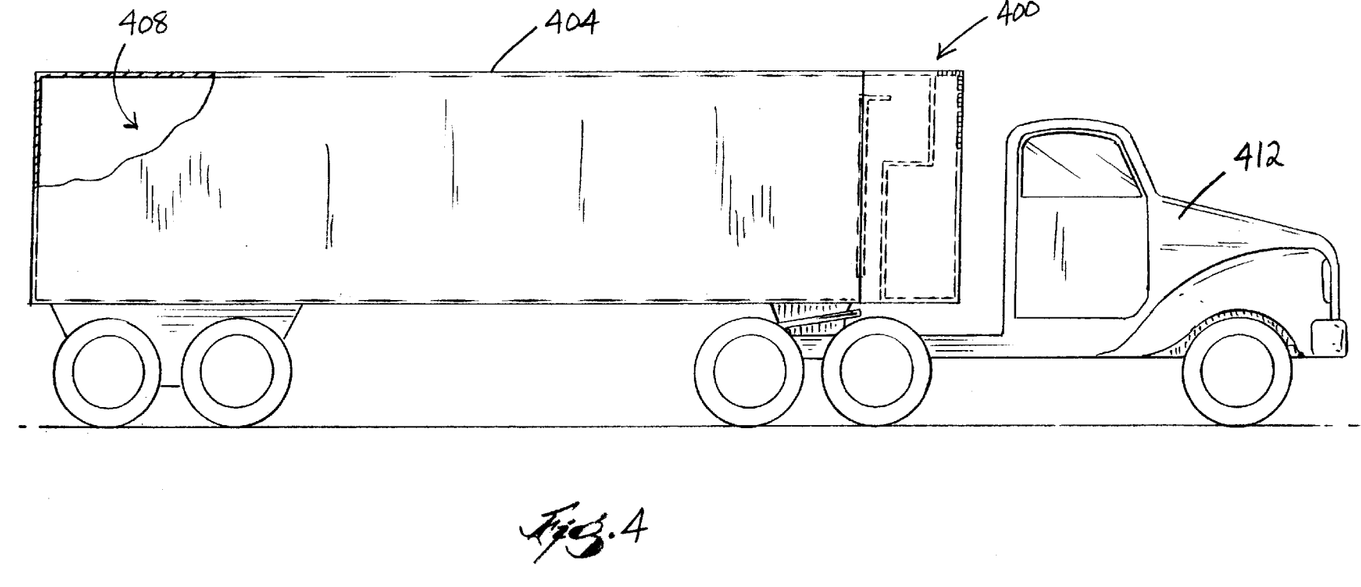
FIG. 4 is a side view, partially in section, of a vehicle having a temperature control unit embodying the present invention.
Figure 5:
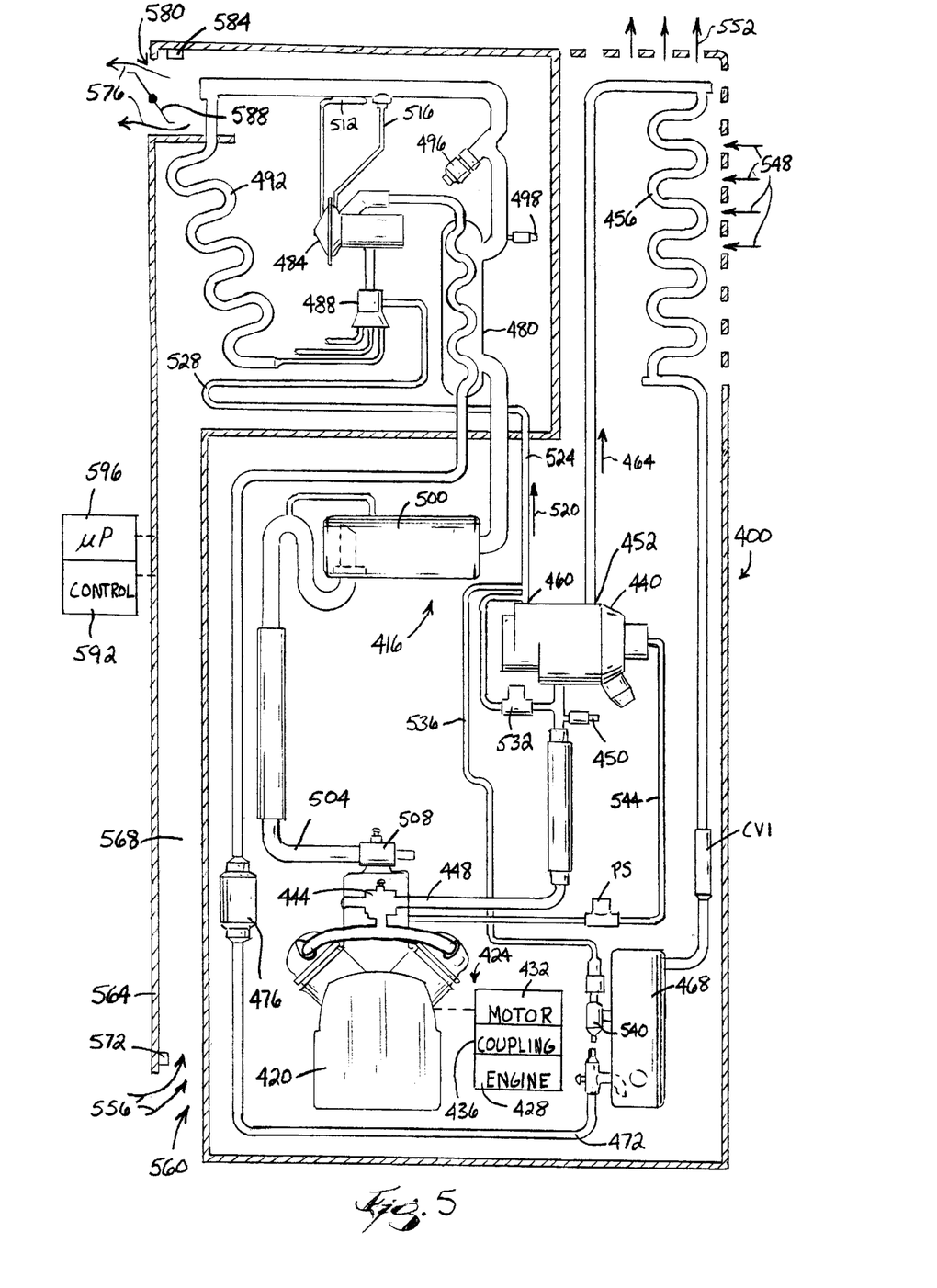
FIG. 5 is a schematic representation of the temperature control unit of FIG. 4.

Referring now to FIGS. 4 and 5, there is shown a temperature control unit 400 which may utilize the present inventive method. The temperature control unit 400 is especially suitable for use in transport applications and may be mounted on a container, truck, or trailer. FIG. 4 shows the unit 400 mounted on a trailer 404 having a conditioned cargo space 408. The trailer is pulled by a tractor 412, as is understood by those skilled in the art.

The temperature control unit 400 controls the temperature of the conditioned space 408 to a specified temperature range adjacent to a selected thermal set point. As seen in FIG. 5, the temperature control unit 400 has a closed fluid refrigerant circuit or flow path 416 which includes a refrigerant compressor 420 driven by a prime mover arrangement 424. The prime mover arrangement 424 of the preferred embodiment includes an internal combustion engine 428 and an optional stand-by electric motor 432. The engine 428 and the motor 432, when both are utilized, are coupled to the compressor 420 by a suitable clutch or coupling 436 which disengages the engine 428 while the motor 432 is operative.

Discharge ports of the compressor 420 are connected to an inlet port of a three-way valve 440 via a discharge service valve 444 and a discharge line 448. A discharge pressure transducer 450 is located in the discharge line 448, upstream of the three-way valve 440, to measure the discharge pressure of the compressed refrigerant. The functions of the three-way valve 440, which selects heating and cooling cycles, may be provided by two separate valves, if desired. The three-way valve 440 has a first outlet port 452, which is selected to initiate a cooling cycle, with the first outlet port 452 being connected to the inlet side of a condenser coil 456. The three-way valve 440 has a second outlet port 460, which is selected to initiate a heating cycle.

When the three-way valve 440 selects the cooling cycle outlet port 452, it connects the compressor 420 in a first refrigerant flow path 464, which in addition to the condenser coil 456, includes a one-way condenser check valve CV1, a receiver 468, a liquid line 472, a refrigerant drier 476, a heat exchanger 480, an expansion valve 484, a refrigerant distributor 488, an evaporator coil 492, an electronic throttling valve 496, a suction pressure transducer 498, another path through the heat exchanger 480, an accumulator 500, a suction line 504, and back to a suction port of compressor 420 via a suction line service valve 508. The expansion valve 484 is controlled by a thermal bulb 512 and an equalizer line 516.

When the three-way valve 440 selects the heating cycle outlet port 460, it connects the compressor 420 in a second refrigerant flow path 520. The second refrigerant flow path 520 by-passes the condenser coil 456 and the expansion valve 484, connecting the hot gas output of compressor 420 to the refrigerant distributor 488 via a hot gas line 524 and a defrost pan heater 528. A hot gas by-pass solenoid valve 532 may optionally be disposed to inject hot gas into the hot gas line 524 during a cooling cycle. A by-pass or pressurizing line 536 connects the hot gas line 524 to the receiver 468 via by-pass and check valves 540, to force refrigerant from the receiver 468 into an active refrigerant flow path during heating and defrost cycles.

A conduit or line 544 connects the three-way valve 440 to the low pressure side of the compressor 420 via a normally closed pilot solenoid valve PS. When the solenoid valve PS is de-energized and thus closed, the three-way valve 440 is spring biased to select the cooling cycle outlet port 452. When the evaporator coil 492 requires defrosting, and when a load being conditioned in the conditioned space 408 requires heat to maintain thermal set point, the pilot solenoid valve PS is energized and the low pressure side of the compressor 420 operates the three-way valve 440 to select the heating cycle outlet port 460 to initiate a heating cycle or a defrost cycle.

A condenser fan or blower (not shown), which may be driven by the prime mover arrangement 424, causes ambient air 548 to flow through the condenser coil 456, with the resulting heated air 552 being discharged to the atmosphere. An evaporator fan or blower (not shown), which also may be driven by the prime mover arrangement 424, draws air 556, called "return air", from the conditioned space 408, through an inlet 560 in a bulkhead 564 and up through a bulkhead space 568. The bulkhead 564 preferably runs the entire height of load space 408. A return air temperature sensor 572 samples the air temperature from the bottom of the load space 408.

The resulting conditioned cooled or heated air 576, called "discharge air", is returned or discharged by a fan (not shown) into the conditioned space 408 via an outlet 580. A discharge air temperature sensor 584 samples the air temperature of the discharge air. During an evaporator defrost cycle, a defrost damper 588 may be operated to close the discharge air path to the conditioned space 408.

The transport temperature control unit 400 is controlled by an electrical control 592 which includes a microprocessor based controller 596 and electrical control circuits and components, including relays, solenoids, and the like. The controller 596 receives input signals from appropriate sensors, including inputs from a thermal set point selector (not shown), which may be actuated to select the desired temperature of the conditioned space 408, an ambient air temperature sensor (not shown), the return air temperature sensor 572, the discharge temperature sensor 584, a coil temperature sensor and switch (not shown) disposed to sense the temperature of the evaporator coil 492, the discharge pressure transducer 450, and the suction pressure transducer 498. The controller 596 provides output signals to, among other things, the electronic throttling valve 496 to control the positioning of the electronic throttling valve 496, as described above.

Various features of the invention are set forth in the following claims.

What is claimed is:

1. A method of controlling the operation of an electronic throttling valve in a temperature control unit having first and second pressure measurement devices, the method comprising:

determining whether the first pressure measurement device is functioning;

determining whether the second pressure measurement device is functioning;

controlling the electronic throttling valve using data measured by both the first and second pressure measurement devices when both the first and second pressure measurement devices are determined to be functional;

controlling the electronic throttling valve using data measured by only one of the first and second pressure measurement devices when the other of the first and second pressure measurement devices is determined to be non-functional; and controlling the electronic throttling valve using temperature data measured by the temperature control unit when both the first and second pressure measurement devices are determined to be non-functional.

2. The method of claim 1, wherein the electronic throttling valve is part of a compressor having a suction end and a discharge end, wherein the first pressure measurement device communicates with the suction end and the second pressure measurement device communicates with the discharge end, and wherein controlling the electronic throttling valve includes controlling the pressure at the discharge end of the compressor.

3. The method of claim 1, wherein determining whether the first pressure measurement device is functioning includes comparing a reference pressure value that is measured by the first pressure measurement device before the temperature control unit is started to a pressure value that is measured by the first pressure measurement device after the temperature control unit is started.

4. The method of claim 1, wherein determining whether the second pressure measurement device is functioning includes comparing a reference pressure value that is measured by the second pressure measurement device before the temperature control unit is started to a pressure value that is measured by the second pressure measurement device after the temperature control unit is started.

5. The method of claim 1, wherein controlling the electronic throttling valve using data measured by both the first and second pressure measurement devices includes adjusting the electronic throttling valve to substantially maintain a desired ratio between the data measured by the first pressure measurement device and the data measured by the second pressure measurement device.

6. The method of claim 5, wherein the desired ratio is approximately 1 to 24.

7. The method of claim 1, wherein controlling the electronic throttling valve using data measured by only one of the first and second pressure measurement devices includes adjusting the electronic throttling valve to substantially maintain a desired value for the data measured by the one of the first and second pressure measurement devices.

8. The method of claim 7, wherein the first pressure measurement device communicates with a suction end of a compressor in the temperature control unit, and wherein the electronic throttling valve is controlled using data measured by the first pressure measurement device.

9. The method of claim 7, wherein the second pressure measurement device communicates with a discharge end of a compressor in the temperature control unit, and wherein the electronic throttling valve is controlled using data measured by the second pressure measurement device.

10. The method of claim 1, wherein the temperature control unit measures an ambient temperature and a return air temperature, and wherein controlling the electronic throttling valve using temperature data includes adjusting the electronic throttling valve to keep the difference between the ambient temperature and the return air temperature below a desired maximum value.

11. The method of claim 1, further including determining whether the electronic throttling valve is functioning.

12. The method of claim 11, wherein determining whether the electronic throttling valve is functioning includes:

setting the electronic throttling valve to a desired position; and measuring a pressure value with one of the first and second pressure measurement devices when the electronic throttling valve is set to the desired position to determine whether the electronic throttling valve actually moved to the desired position.

13. The method of claim 12, further including shutting down the temperature control unit when the electronic throttling valve did not actually move to the desired position.

14. A method of monitoring the operation of an electronic throttling valve in a temperature control unit having at least one pressure measurement device, a cooling mode, and a heating mode, the method comprising:

testing the functionality of the at least one pressure measurement device during start-up of the temperature control unit; and testing the functionality of the electronic throttling valve after the temperature control unit is running.

15. The method of claim 14, wherein testing the functionality of the at least one pressure measurement device during start-up of the temperature control unit includes comparing a reference pressure value that is measured by the at least one pressure measurement device before the temperature control unit is started to a pressure value that is measured by the at least one pressure measurement device after the temperature control unit is started.

16. The method of claim 14, wherein testing the functionality of the electronic throttling valve after the temperature control unit is running includes:

setting the electronic throttling valve to a desired position; and measuring a pressure value with the at least one pressure measurement device when the electronic throttling valve is set to the desired position to determine whether the electronic throttling valve actually moved to the desired position.

17. The method of claim 16, further including shutting down the temperature control unit when the electronic throttling valve did not actually move to the desired position.

18. The method of claim 14, further including testing the functionality of the at least one pressure measurement device when the temperature control unit is running and transitions between the cooling mode and the heating mode.

19. The method of claim 18, wherein testing the functionality of the at least one pressure measurement device when the temperature control unit transitions between the cooling mode and the heating mode includes comparing a reference pressure value that is measured by the at least one pressure measurement device before the transition has occurred to a pressure value that is measured by the at least one pressure measurement device after the transition has occurred.

20. A cooling system comprising:

a compressor having an inlet, an outlet, and an electronic throttling valve that meters the flow of a refrigerant to the inlet; and a control for the electronic throttling valve, the control including:

a device for measuring an inlet pressure at the inlet;

a device for measuring an outlet pressure at the outlet;

a microprocessor connected to the inlet pressure measurement device and the outlet pressure measurement device; and a program module for determining whether the inlet pressure measurement device is functioning, determining whether the outlet pressure measurement device is functioning, controlling the electronic throttling valve using data measured by both the inlet and the outlet pressure measurement devices when both the inlet and the outlet pressure measurement devices are determined to be functional, controlling the electronic throttling valve using data measured by only one of the inlet and the outlet pressure measurement devices when the other of the inlet and the outlet pressure measurement devices is determined to be non-functional, and controlling the electronic throttling valve using temperature data measured by the temperature control unit when both the inlet and the outlet pressure measurement devices are determined to be non-functional.

* * * * *